(12) United States Patent
Bichsel

(10) Patent No.: US 8,316,544 B2
(45) Date of Patent: Nov. 27, 2012

(54) EXPANDABLE PRECURED JOINT FILLER

(75) Inventor: Steven L. Bichsel, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 686 days.

(21) Appl. No.: 12/475,960

(22) Filed: Jun. 1, 2009

(65) Prior Publication Data

US 2010/0301166 A1 Dec. 2, 2010

(51) Int. Cl.
B21D 53/88 (2006.01)
B64C 1/12 (2006.01)
(52) U.S. Cl. ........................ 29/897.2; 244/131
(58) Field of Classification Search .............. 29/897.2, 29/897.32, 428, 451, 458, 507, 508, 743; 244/133
See application file for complete search history.

(56) References Cited

U.S. PATENT DOCUMENTS

| 2,071,299 | A | | 2/1937 | Gammeter |
| 2,699,580 | A | | 1/1955 | Smith |
| 2,701,899 | A | | 2/1955 | Krupp |
| 2,720,011 | A | | 10/1955 | Krupp |
| 3,042,980 | A | | 7/1962 | Brinsmade |
| 3,074,520 | A | | 1/1963 | Grubelich |
| 3,276,335 | A | * | 10/1966 | Middlestadt .................. 404/48 |
| 3,339,931 | A | | 9/1967 | Hundt et al. |
| 3,360,273 | A | | 12/1967 | Hundt et al. |
| 3,891,224 | A | | 6/1975 | Ditcher |
| 4,305,680 | A | | 12/1981 | Rauchfuss, Jr. |
| 4,741,542 | A | | 5/1988 | Kimerly |
| 5,181,341 | A | | 1/1993 | Keys et al. |
| 5,826,887 | A | | 10/1998 | Neumann et al. |
| 5,979,828 | A | | 11/1999 | Gruensfelder et al. |
| 5,997,006 | A | | 12/1999 | Westhoff et al. |
| 6,136,116 | A | * | 10/2000 | Reis et al. ..................... 156/71 |
| 6,558,503 | B1 | | 5/2003 | Healey |

* cited by examiner

Primary Examiner — John C Hong
(74) Attorney, Agent, or Firm — Bracewell & Giuliani LLP

(57) ABSTRACT

A method of manufacturing an aircraft having adjacent spaced apart surface panels using a hollow filler within the gap between the spaced apart surface panels.

13 Claims, 5 Drawing Sheets

EXPANDABLE PRECURED JOINT FILLER

STATEMENT OF GOVERNMENT INTEREST

This invention was made under U.S. Government Contract N00019-02-C-3002. The Government has certain rights in the invention.

BACKGROUND

This disclosure relates to manufacturing aircraft outer surfaces.

DETAILED DESCRIPTION

Figure 1:
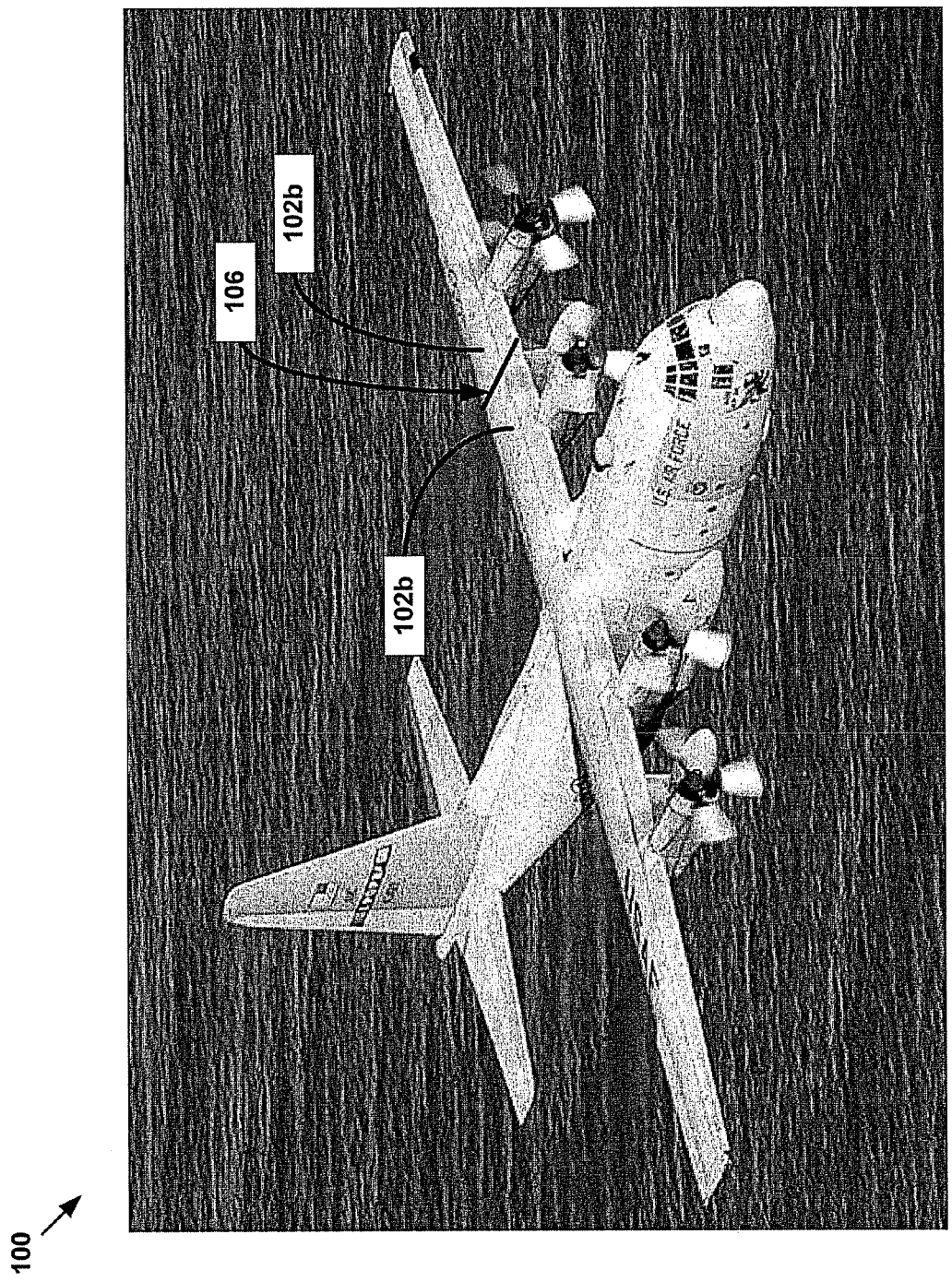
FIG. 1 is an illustration of an exemplary embodiment of an aircraft having at least a pair of adjacent panels.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Figure 2:
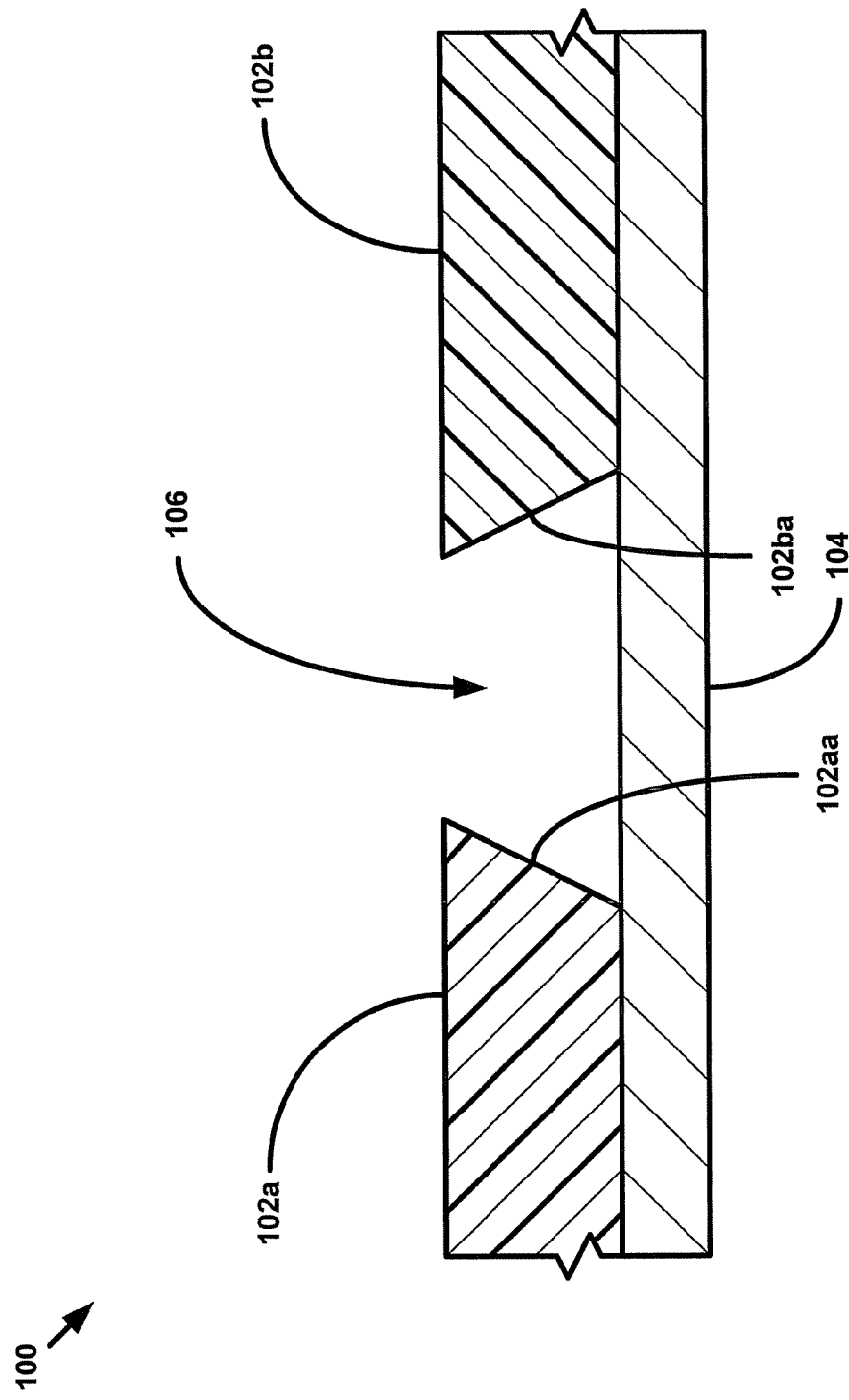
FIG. 2 is a fragmentary cross sectional illustration of a pair of adjacent panels on the aircraft of FIG. 1 having a gap therebetween.

Referring initially to FIGS. 1 and 2, an exemplary embodiment of an aircraft 100, during manufacturing, includes a pair of adjacent surface panels, 102a and 102b, supported on a substrate 104 and spaced apart from one another to thereby define a gap 106. In an exemplary embodiment, the surface panels, 102a and 102b, may, for example, be composed of a metallic material and/or a composite material. In an exemplary embodiment, the opposing faces, 102aa and 102ba, of the adjacent surface panels, 102a and 102b, are inclined in the direction of one another. As a result, the spacing between the upper portions of the opposing faces, 102aa and 102ba, of the adjacent surface panels, 102a and 102b, are less than the spacing between the lower portions of the opposing faces of the adjacent surface panels.

Figure 3:
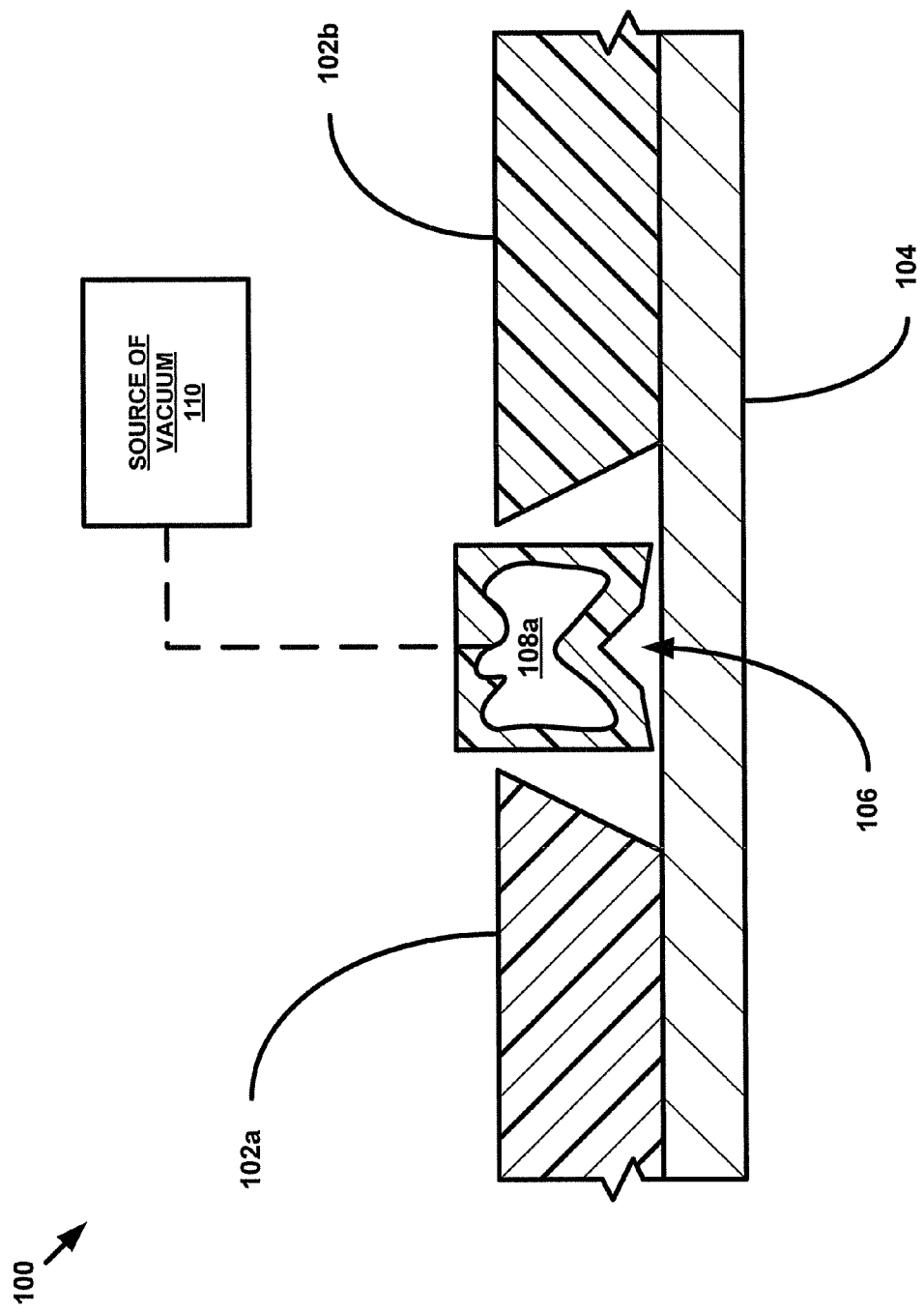
FIG. 3 is a fragmentary cross sectional illustration of the pair of adjacent panels of FIG. 2 after placing a filler having a hollow core within the gap between the adjacent panels while applying a vacuum to the hollow core of the filler.

Referring now to FIG. 3, in an exemplary embodiment, a filler 108 that defines an internal cavity 108a may then be positioned within the gap 106 between the adjacent surface panels, 102a and 102b. In an exemplary embodiment, the filler 108 is positioned within the gap 106 between the adjacent surface panels, 102a and 102b, while applying a vacuum to the cavity 108a of the filler using a conventional source of vacuum 110. In an exemplary embodiment, the filler 108 is composed of a flexible resilient material such as, for example, a pre-cured polymer or a pre-cured composite material. In an exemplary embodiment, an adhesive, primer and/or sealant may be applied to the interior surfaces of the gap 106, prior to the insertion of the filler 108 into the gap, in order to facilitate the subsequent retention of the filler within the gap.

Figure 4:
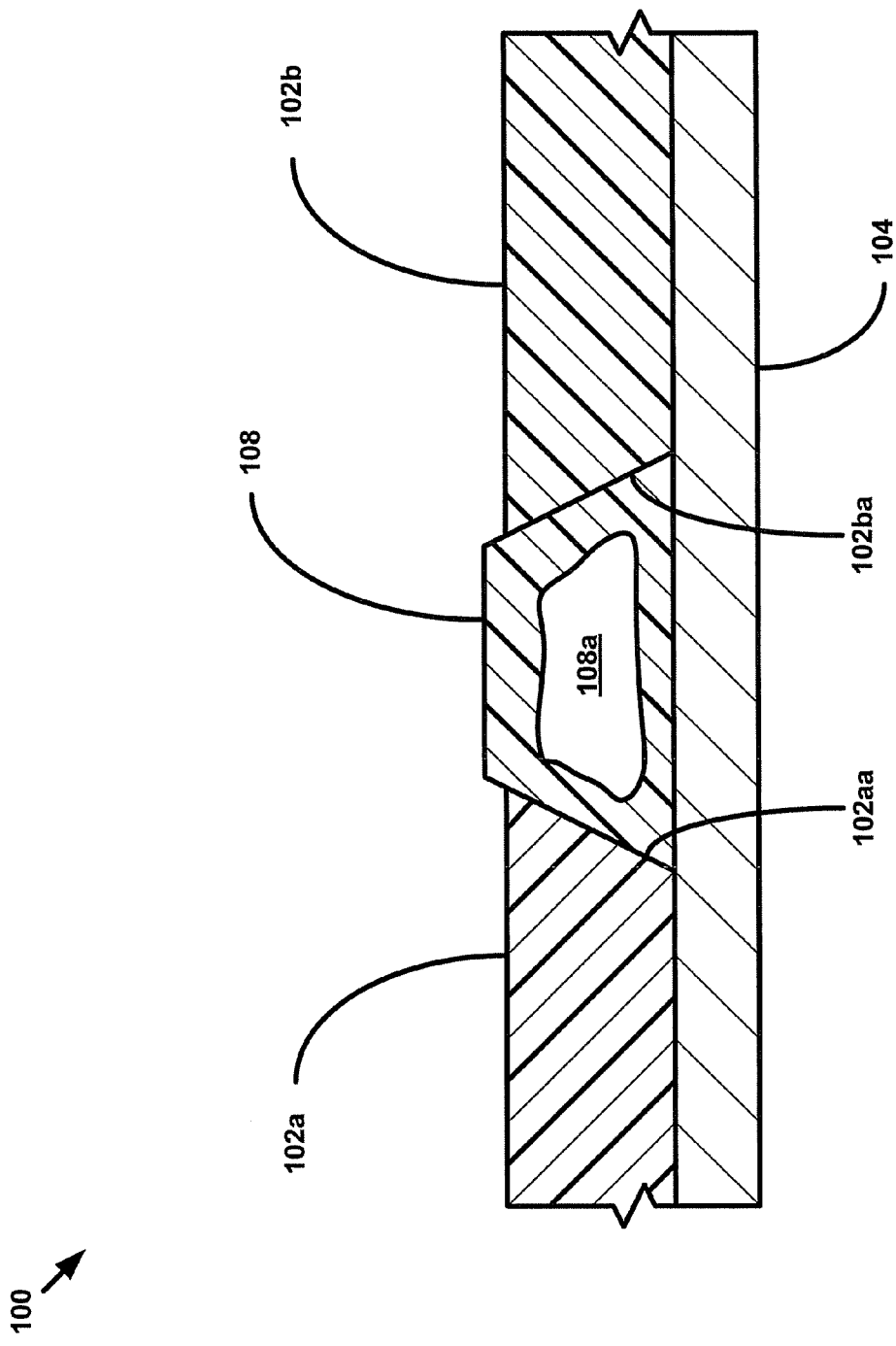
FIG. 4 is a fragmentary cross sectional illustration of the pair of adjacent panels of and filler of FIG. 3 after no longer applying a vacuum to the hollow core of the filler.

Referring now to FIG. 4, in an exemplary embodiment, the source of vacuum 110 is then no longer operated to apply a vacuum to the cavity 108a of the filler 108. As a result, the filler 108 expands to fill the gap 106 between the adjacent surface panels, 102a and 102b. In an exemplary embodiment, in order to further increase the expansion of the filler 108, a pressurized gas and/or uncured foam or filler material such as, for example, a sealant, may also be injected into the cavity 108a. Furthermore, in an exemplary embodiment, the inclined opposing end faces, 102aa and 102ab, of the adjacent surface panels, 102a and 102b, capture and retain the filler 108 within the gap 106.

Figure 5:
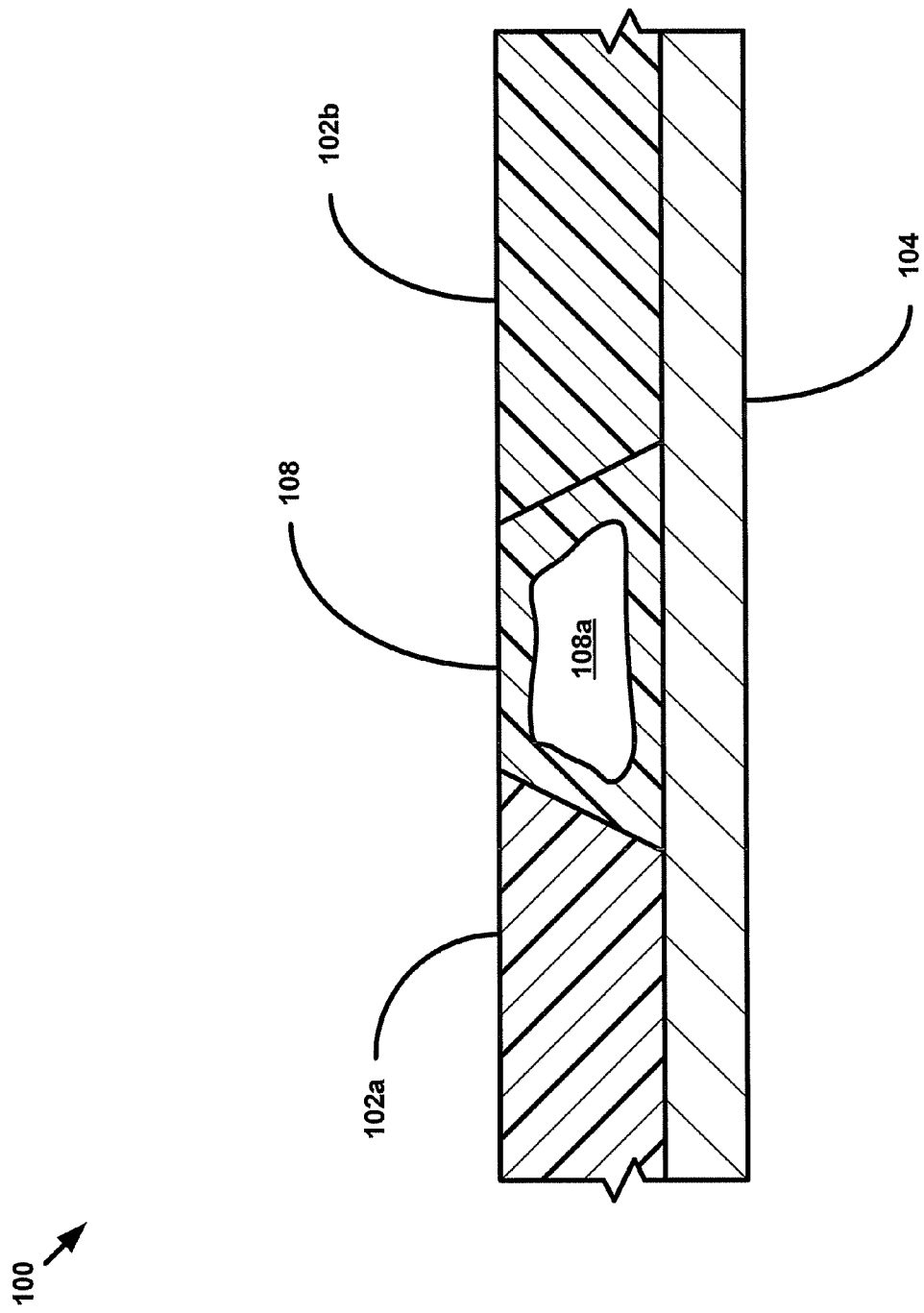
FIG. 5 is a fragmentary cross sectional illustration of the pair of adjacent panels of and filler of FIG. 4 after machining the portion of the filler that extends above the top surfaces of the adjacent panels.

Referring now to FIG. 5, in an exemplary embodiment, any portion of the filler 108 that extends above the top surfaces of the adjacent surface panels, 102a and 102b, may then be machined away. In this manner, a smooth outer surface is provided that is more aerodynamic. The use of an pre-cured filler 108 reduces shrinkage effects that would otherwise occur if the filler were not pre-cured. Furthermore, the use of a pre-cured filler 108 reduces the presence of volatile chemicals and minimizes curing times that would otherwise be required.

It is understood that variations may be made in the above without departing from the scope of the invention. For example, while the exemplary embodiments are directed to the manufacture of an aircraft, the teachings of the present disclosure may be applied to the manufacture of any structure such as, for example, automobiles, boats, naval ships, and buildings. Further, spatial references are for the purpose of illustration only and do not limit the specific orientation or location of the structure described above. While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. A method of manufacturing an aircraft comprising a pair of adjacent spaced apart surface panels supported on a substrate, comprising:

positioning a filler that defines a hollow cavity within a gap between a pair of adjacent spaced apart surface panels while applying a vacuum to the hollow cavity;

then no longer applying the vacuum to the hollow cavity of the filler to fill the gap between the adjacent pair of spaced apart surface panels; and then machining at least a portion of any portion of the filler that extends above either of the top surfaces of the adjacent surface panels.

2. The method of claim 1, wherein each of the adjacent surface panels comprise end faces positioned in opposition to one another; and wherein the end faces of the adjacent surface panels are inclined.

3. The method of claim 2, wherein upper portions of the ends faces of the surface panels are positioned closer to one another than lower portions of the end faces of the surface panels.

4. The method of claim 1, wherein the pair of adjacent surface panels are supported by a surface of a substrate, wherein the gap is defined by opposing surfaces of the adjacent surface panels and the surface of the substrate, the method further comprising:
 capturing and retaining the filler within the gap, the filler captured and retained by the opposing surfaces of the adjacent surface panels after the vacuum has ceased to be applied to the hollow cavity of the filler.

5. The method of claim 1,
 wherein one or more of the surface panels comprise a composite material;
 wherein each of the adjacent surface panels comprise end faces positioned in opposition to one another; and
 wherein proximal portions of the ends faces of the surface panels are positioned closer to one another than distal portions of the end faces of the surface panels adjacent a common supporting substrate.

6. The method of claim 1, wherein each of the adjacent surface panels comprise end faces positioned in opposition to one another, wherein the filler comprises a precured material, and wherein the method further comprises the step of:
 applying the vacuum to the hollow cavity with an external vacuum device when simultaneously performing the step of positioning the filler between the adjacent pair of surface panels,
 wherein the step of no longer applying the vacuum to the hollow cavity includes ceasing application of the vacuum to the hollow cavity by the external vacuum device after the filler is positioned between the end faces of the adjacent pair of surface panels.

7. A method of manufacturing a structure comprising a pair of adjacent spaced apart surface panels supported on a substrate, comprising:
 positioning a filler that defines a hollow cavity within a gap between a pair of adjacent spaced apart surface panels while applying a vacuum to the hollow cavity;
 then no longer applying the vacuum to the hollow cavity of the filler to fill the gap between the adjacent pair of spaced apart surface panels; and
 then machining at least a portion of any portion of the filler that extends above either of the top surfaces of the adjacent surface panels.

8. The method of claim 7, wherein each of the adjacent surface panels comprise end faces positioned in opposition to one another; and wherein the end faces of the adjacent surface panels are inclined.

9. The method of claim 8, wherein upper portions of the ends faces of the surface panels are positioned closer to one another than lower portions of the end faces of the surface panels.

10. The method of claim 7,
 wherein one or more of the surface panels comprise a composite material
 wherein each of the adjacent surface panels comprise end faces positioned in opposition to one another; and
 wherein proximal portions of the ends faces of the surface panels are positioned closer to one another than distal portions of the end faces of the surface panels adjacent a common supporting substrate.

11. The method of claim 7, wherein each of the adjacent surface panels comprise end faces positioned in opposition to one another, wherein one or more of the surface panels comprise a metallic material, and wherein the method further comprises the step of:
 applying the vacuum to the hollow cavity with an external vacuum device when simultaneously performing the step of positioning the filler between the adjacent pair of surface panels,
 wherein the step of no longer applying the vacuum to the hollow cavity includes ceasing application of the vacuum to the hollow cavity by the external vacuum device after the filler is positioned between the end faces of the adjacent pair of surface panels.

12. The method of claim 7, wherein each of the adjacent surface panels comprise end faces positioned in opposition to one another, wherein the filler comprises a precured material, and wherein the method further comprises the step of:
 applying the vacuum to the hollow cavity with an external vacuum device when simultaneously performing the step of positioning the filler between the adjacent pair of surface panels,
 wherein the step of no longer applying the vacuum to the hollow cavity includes ceasing application of the vacuum to the hollow cavity by the external vacuum device after the filler is positioned between the end faces of the adjacent pair of surface panels.

13. The method of claim 7, wherein the pair of adjacent surface panels are supported by a surface of a substrate, wherein the gap is defined by opposing surfaces of the adjacent surface panels and the surface of the substrate, the method further comprising:
 capturing and retaining the filler within the gap, filler captured and retained by the opposing surfaces of the adjacent surface panels after the vacuum has ceased to be applied to the hollow cavity of the filler.

* * * * *